(12) United States Patent
Hong et al.

(10) Patent No.: US 7,907,479 B2
(45) Date of Patent: Mar. 15, 2011

(54) OPTICAL PICKUP ACTUATOR IN WRITING AND READING DEVICE

(75) Inventors: Sam Nyol Hong, Suwon-si (KR); In Ho Choi, Seongnam-si (KR); Kyung Taek Lee, Yongin-si (KR)

(73) Assignee: Ionosep X Holdings L.L.C., Wilmington, DE (US)

( * ) Notice: Subject to any disclaimer, the term of this patent is extended or adjusted under 35 U.S.C. 154(b) by 966 days.

(21) Appl. No.: 11/033,795

(22) Filed: Jan. 11, 2005

(65) Prior Publication Data

US 2005/0152238 A1    Jul. 14, 2005

(30) Foreign Application Priority Data

Jan. 14, 2004    (KR) .................. 10-2004-0002675

(51) Int. Cl.
*G11B 7/00*    (2006.01)
(52) U.S. Cl. ................... 369/44.15; 369/44.22
(58) Field of Classification Search ................ 369/44.16
See application file for complete search history.

(56) References Cited

U.S. PATENT DOCUMENTS

| | | | |
|---|---|---|---|
| 4,472,024 A | 9/1984 | Konomura et al. | |
| 5,063,548 A * | 11/1991 | Yamashita et al. | 369/44.14 |
| 5,265,079 A * | 11/1993 | Getreuer et al. | 369/44.14 |
| 5,311,489 A * | 5/1994 | Suzuki et al. | 369/44.14 |
| 5,347,500 A * | 9/1994 | Eguchi | 369/44.14 |
| 5,612,935 A * | 3/1997 | Ishimatsu | 369/44.14 |
| 5,663,843 A | 9/1997 | Ezawa et al. | |
| 5,841,593 A * | 11/1998 | Ikegame et al. | 359/823 |
| 6,069,867 A | 5/2000 | Ikegame et al. | |
| 6,246,552 B1 | 6/2001 | Soeno et al. | |
| 6,341,104 B1 * | 1/2002 | Yamaguchi et al. | 369/44.15 |
| 6,449,230 B1 * | 9/2002 | Seto | 369/53.19 |
| 6,501,710 B2 * | 12/2002 | Yokoyama et al. | 369/44.14 |
| 6,717,892 B2 * | 4/2004 | Sheu et al. | 369/44.14 |
| 7,054,236 B2 * | 5/2006 | Kawano | 369/44.16 |
| 2002/0021651 A1 * | 2/2002 | Hong et al. | 369/112.23 |
| 2003/0112719 A1 * | 6/2003 | Hong et al. | 369/44.16 |

FOREIGN PATENT DOCUMENTS

| | | |
|---|---|---|
| CN | 1154540 | 7/1997 |
| CN | 1154540 A | 7/1997 |
| EP | 1 058 243 A1 | 12/2000 |
| EP | 1058243 A1 | 12/2000 |
| JP | 06-314432 | 11/1994 |
| JP | 6-314432 A | 11/1994 |

(Continued)

OTHER PUBLICATIONS

CNOA issued Mar. 2, 2007 for Chinese Patent Application No. 2005100017272, with translation, 20 pages.
CNOA issued Oct. 27, 2006 for Chinese Patent Application No. 2005100017272, with translation, 9 pages.

(Continued)

*Primary Examiner* — Paul Huber
(74) *Attorney, Agent, or Firm* — Turocy & Watson, LLP

(57) ABSTRACT

An optical writing and reading device includes: a base; a main shaft holder fixed to the base; a main shaft supported by the main shaft holder; a pickup base supported by and moving along the main shaft; an optical pick-up actuator formed at the pickup base; an optical system for emitting and receiving a light to and from the optical pick-up actuator to write or read data on or from an optical disk; and a turntable and a spindle motor for rotating the optical disk.

26 Claims, 14 Drawing Sheets

FOREIGN PATENT DOCUMENTS

| | | |
|---|---|---|
| JP | 6314432 | 11/1994 |
| JP | 11-273136 A | 10/1999 |
| JP | 11273136 | 10/1999 |
| JP | 2000-163774 A | 6/2000 |
| JP | 2000163774 | 6/2000 |
| WO | 99/18576 A | 4/1999 |
| WO | WO9918576 | 4/1999 |
| WO | WO 9918576 | 4/1999 |

OTHER PUBLICATIONS

CNOA issued Apr. 28, 2006 for Chinese Patent Application No. 2005100017272, with translation, 9 pages.

EP Search Report for European Patent Application No. EP 04 03 0754, 1 page.

European Office Action dated Jan. 12, 2010, for European Patent Application Serial No. 04030754.8, 3 pages.

* cited by examiner

OPTICAL PICKUP ACTUATOR IN WRITING AND READING DEVICE

CROSS-REFERENCE TO RELATED APPLICATIONS

Pursuant to 35 U.S.C. §119(a), this application claims the benefit of earlier filing date and right of priority to Korean Application No. 2675/2004, filed on Jan. 14, 2004, the contents of which are hereby incorporated by reference herein in their entirety.

BACKGROUND OF THE INVENTION

1. Field of the Invention

The present invention relates to an optical writing and reading device for writing or reading data on or from an optical disk.

2. Description of the Related Art

Generally, an optical writing and reading device is used for a computer, a digital video disk (DVD) player and the like to write and read data on or from an optical disk such as a compact disk, a digital video disk, a blue ray disk, and so forth.

In recent years, as a digital device such as a laptop computer, a camcorder and a digital camera has been reduced in weight and size, it has required to miniaturize the size of the data storage media.

Particularly, it has been continuously studied to apply the optical disk to a mobile device such as a mobile phone and a personal digital assistant (PDA). In order to apply the optical disk to such a mobile device, it is badly required to miniaturize the size of the optical pick-up device.

The size reduction of the optical pick-up device has been hobbled by an actuator for moving a focusing lens to uniformly maintain a distance between the focusing lens and the optical disk and tracing a track on the optical disk to write or read data on or from the optical disk.

The optical pick-up device converts a laser beam eradiated from a laser diode into an optical signal and further converts the optical signal into an electrical signal, thereby reading the recorded data.

The actuator of the optical pick-up device is designed to two-dimensionally move in focusing and tracking directions to safely focus the laser beam on the optical disk even when outer impact is applied. In recent years, to provide more precise motion, an actuator that can move in rolling and pitching directions as well as in the focusing and tracking directions has been developed.

FIGS. 1 through 4 shows a prior optical writing and reading device.

A prior optical writing and reading device includes an optical pick-up device 50, an optical pick-up motor 60 for moving the optical pick-up device 50 to a proper position, a lead screw 20 connected to a rotational shaft of the optical pick-up motor 60, a rack gear 30 designed to be engaged with the lead screw 20, a guide feeder 10 coupled to the rack gear 30, an optical pick-up moving shaft 21 guiding a reciprocal motion of the guide feeder 10, and a main shaft 22 installed on an opposite side of the optical pick moving shaft 21 to guide the motion of the optical pick-up device.

As the optical pick up motor 60 is operated, the lead screw 20 rotates and the rack gear 30 engaged with the lead screw 20 moves, thereby moving the optical pick-up device 50 to a desired position.

As shown in FIG. 2, the optical pick-up actuator 40 is comprised of a movable part moving a focusing lens 49 in the focusing and tracking directions and a stationary part for supporting the movable part and generating magnetic field.

The movable part has a coil cooperating with a permanent magnet 43 provided on the stationary part to locate the focusing lens 49 to the desired position.

That is, the stationary part includes the permanent magnet 43 generating magnetic field, a yoke 42 forming a path of the magnetic field, the fixing frame 41 having a main board (not shown), and wire-shaped springs 47 each having a first end 47a fixed on the fixing frame 41 and a second end fixed on the lens holder 44 to support the lens holder 44 and supply electric current to the lens holder 44.

The movable part includes the focusing lens 49 focusing a laser beam eradiated from the laser diode on a recording layer of the optical disk, a lens holder 44 holding the focusing lens 49, tracking coils 45 installed on both sides of the lens holder 44 to drive the lens holder 44 in the tracking direction, a focusing coil 46 wound around the lens holder 44 to drive the lens holder 44 in the focusing direction, and a spring fixing unit 48 fixing the spring assembly 47 on the lens holder 44.

The movable part should be designed having a desired frequency property by being fixed by a support having a predetermined rigidity and a predetermined damping property. In addition, the movable part should be designed avoiding unnecessary vibration such as rotation or twist to effectively move in the focusing and tracking directions and reduce the optical signal error.

That is, when the movable part drives in the focusing direction, the lens holder 44 should vertically move without rotating in a direction of an X-axis (in the pitching direction shown in FIG. 5). Therefore, as shown in FIG. 3, the spring assembly 47 is comprised of two lower springs and two upper springs stacked on the lower springs that are installed on both sides of the lens holder 44, being extending from the fixing frame 41.

As shown in FIG. 4, in order to eliminate the space limitation in designing the optical pick-up device by reducing a thickness of the actuator, it has been developed that springs 97 may be comprised of one lower spring and one upper spring stacked on the lower spring.

However, in this case, when the optical pick-up device moves in the focusing direction, the lens holder 44 may rotate in the direction of the X-axis, causing the undesired inclination.

Even when the spring assembly 47 is formed as shown in FIG. 3, an elastic coefficient may be varied when the spring is twisted or tensioned during the manufacturing process.

The reduction of the size of the optical reading/writing device may be further limited by a supporting structure supporting the optical pick-up device for reading/writing the data from/on the optical disk.

FIG. 5 shows a prior supporting structure for supporting the optical pick-up device of the optical reading/writing device.

Referring to FIG. 5, the optical reading/writing device includes a base 70, a rubber damper 71 formed on the base 70, a sled base 72 fixed on the rubber damper 71.

The base supports the optical pick-up actuator 40 and provides a space for installing the optical pick-up actuator 40. The rubber damper 71 absorbs vibration and impact generated from the actuator 40 or an external side to allow the optical reading/writing device to smoothly operate.

The sled base 72 is provided with a main shaft holder 73 on which a main shaft 22 is formed to guide the movement of the optical pick-up actuator 40.

A spindle motor 74 is formed on a side portion of the sled base 72 to drive a turntable 75 rotating the optical disk 76.

The above-described supporting structure does not meet a drop in the size reduction tendency of digital devices such as a laptop computer, a camcorder, a digital camera, and the like.

That is, such a supporting structure limits the reduction in the size and weight of the optical reading/writing device.

SUMMARY OF THE INVENTION

Accordingly, the present invention is directed to an optical writing and reading device that substantially obviates one or more problems due to limitations and disadvantages of the related art.

An object of the present invention is to provide an optical writing and reading device, which can effectively drive the optical pick-up device and reduce the size of the optical pick-up device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical writing and reading device including: a base; a main shaft holder fixed to the base; a main shaft supported by the main shaft holder; a pickup base supported by and moving along the main shaft; an optical pick-up actuator formed at the pickup base; an optical system for emitting and receiving a light to and from the optical pick-up actuator to write or read data on or from an optical disk; and a turntable and a spindle motor for rotating the optical disk.

In another aspect of the present invention, there is provided an optical writing and reading device including: a base; a main shaft holder fixed to the base; a main shaft supported by the main shaft holder; a pickup base supported by and moving along the main shaft; an optical pick-up actuator formed at the pickup base; an optical system for emitting and receiving a light to and from the optical pick-up actuator to write or read data on or from an optical disk; a spindle motor fixed on the base; and a turntable disposed on a top of the spindle motor, for rotating the optical disk depending on an operation of the spindle motor.

In a still another aspect of the present invention, there is provided an optical writing and reading device including: an optical pick-up actuator having a fixing frame, a lens holder having a focusing lens, a spring for connecting the fixing frame with the lens holder to support the lens holder and having at least one bend portion, and a coil and a permanent magnet for generating a driving force depending on the applying of a control current to move the lens holder; a main shaft for supporting a pickup base at which the optical pick-up actuator is formed, and guiding a motion of the pickup base; a main shaft holder for supporting the main shaft; an optical system for emitting and receiving a light to and from the optical pick-up actuator to write or read data on or from an optical disk; a turntable for rotating the optical disk and a spindle motor for driving the turntable; and a base for respectively fixing the main shaft holder, the optical system and the spindle motor.

It is to be understood that both the foregoing general description and the following detailed description of the present invention are exemplary and explanatory and are intended to provide further explanation of the invention as claimed.

BRIEF-DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
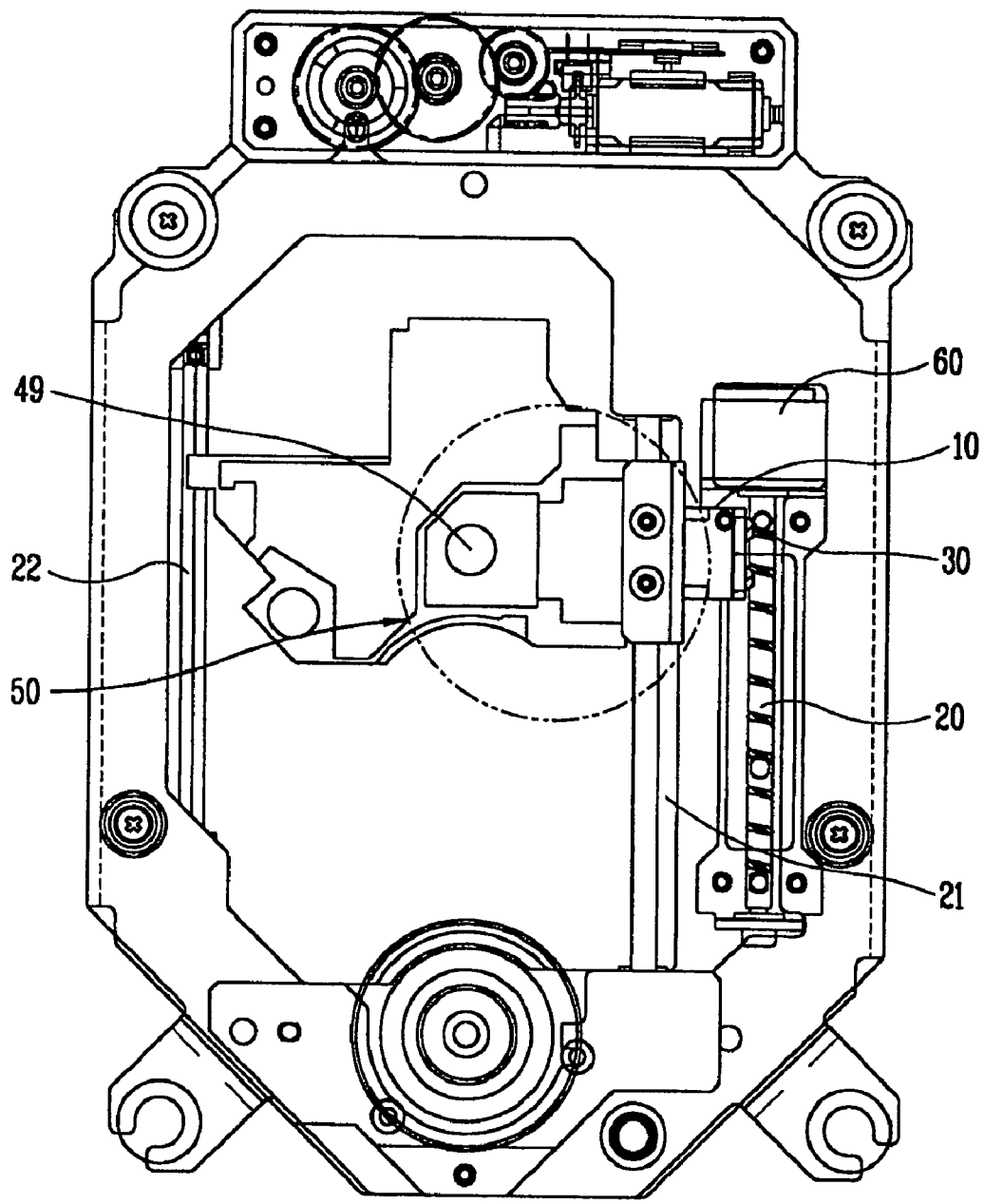
FIG. 1 is a plane view of a prior optical writing and reading device.
Figure 2:
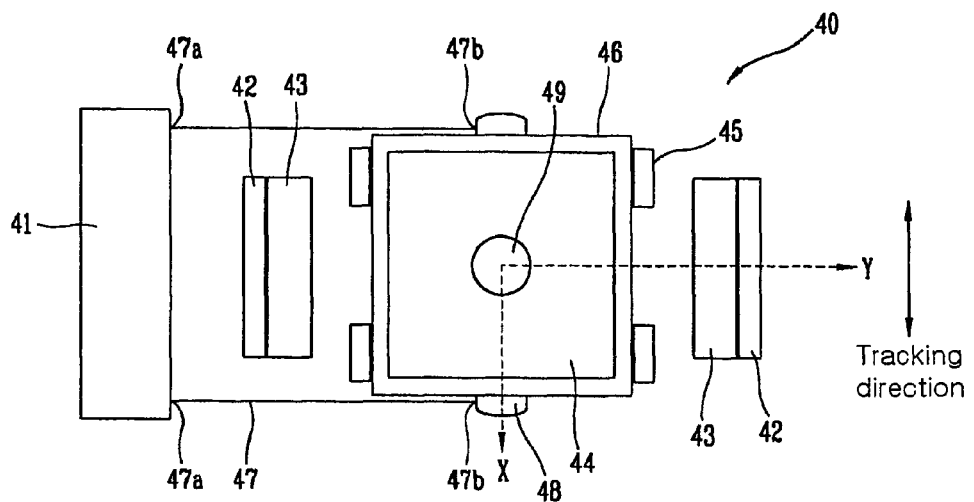
FIG. 2 is a view of an actuator of a prior optical pick-up device.
Figure 3:
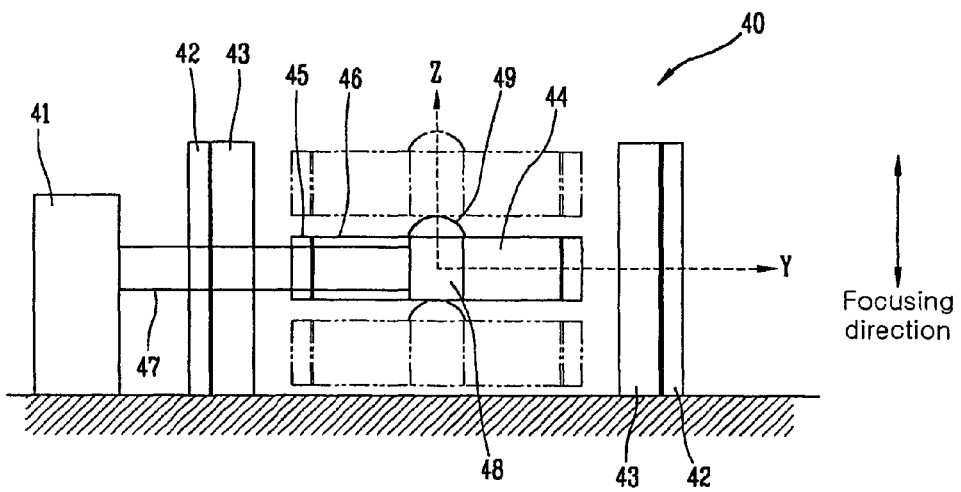
FIGS. 3 and 4 are views illustrating a focusing operation of an actuator of an prior optical pick-up device.
Figure 4:
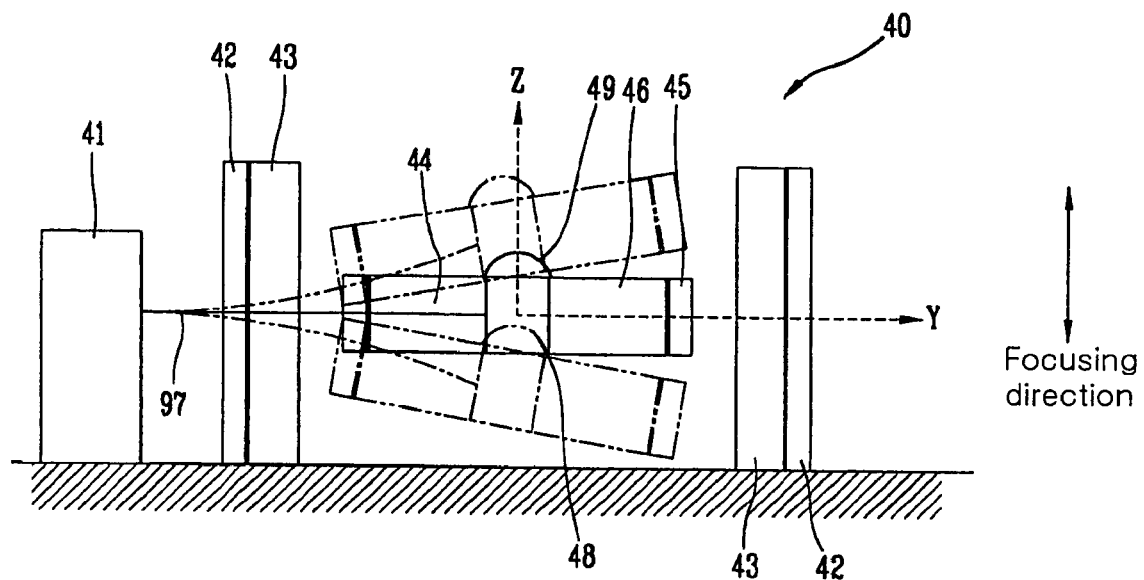
Figure 5:
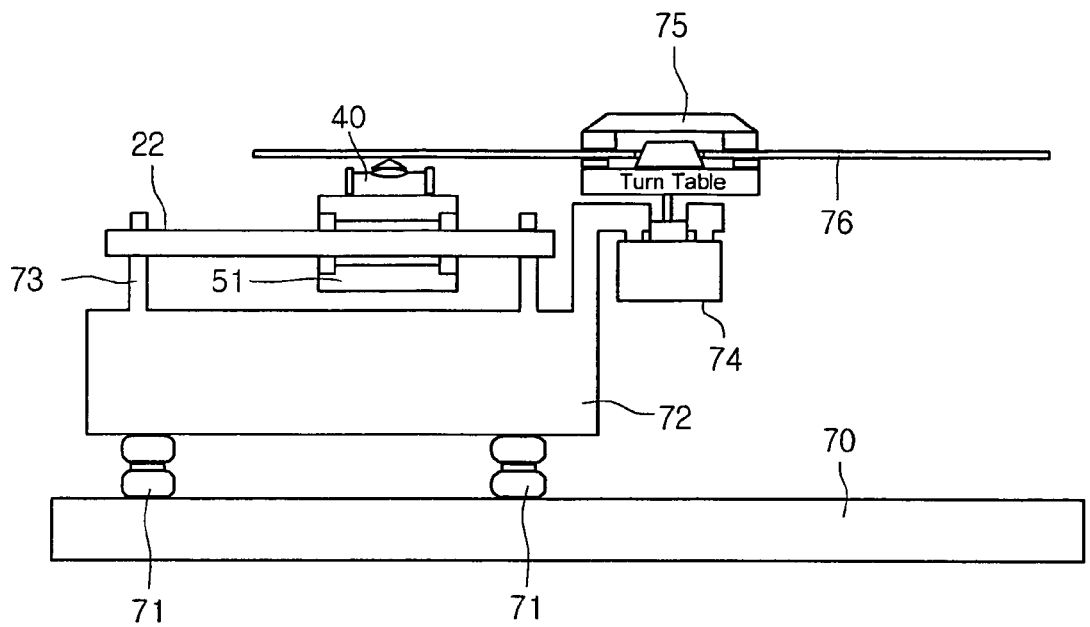
FIG. 5 is a view illustrating a structure supporting an optical pick-up device.
Figure 6:
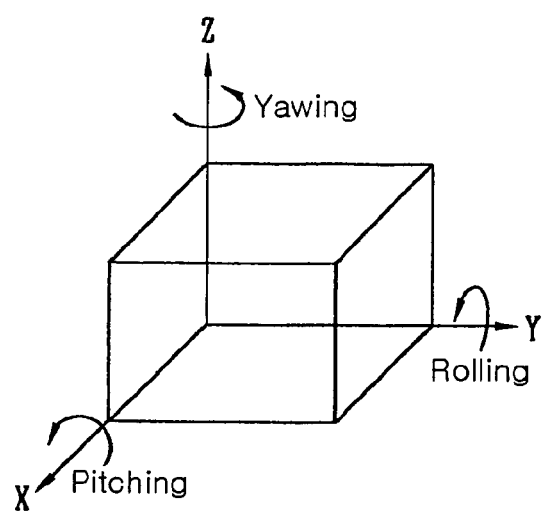
FIG. 6 is a view illustrating rotational directions.
Figure 7:
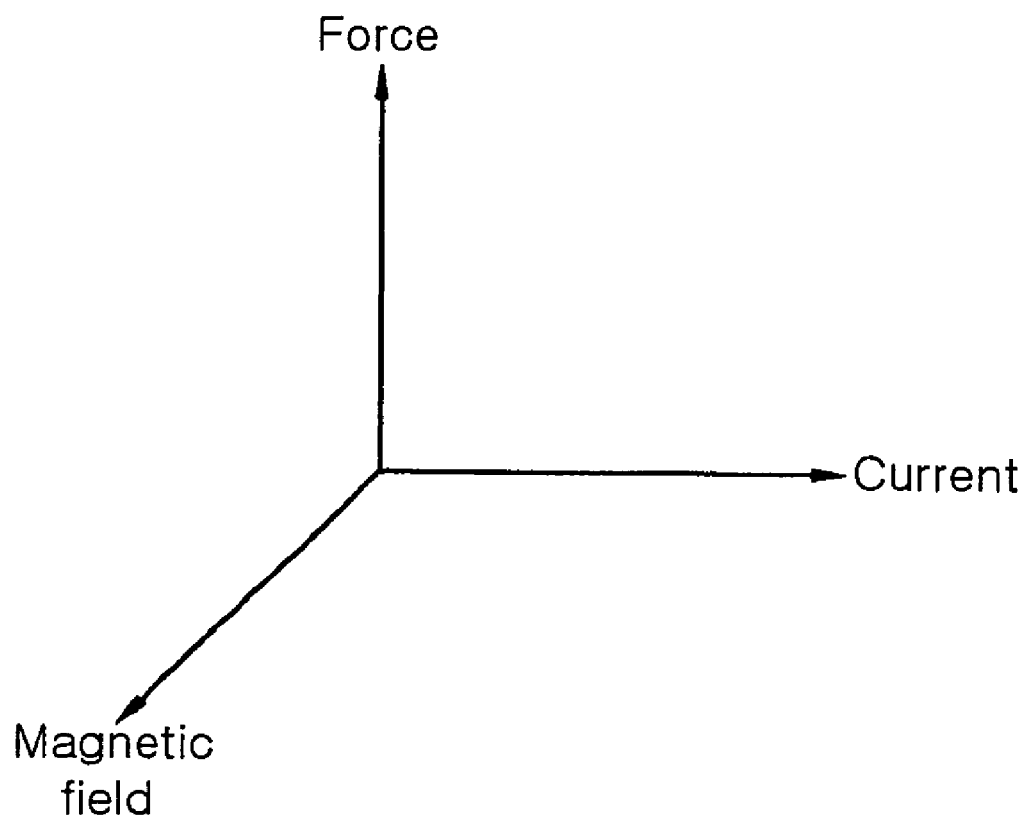
FIG. 7 is a view illustrating Lorentz force.

FIGS. 6 and 7 illustrate an operational theory of an actuator of an optical pick-up device. FIG. 6 illustrates rotational directions and FIG. 7 illustrates Lorentz force.

Rotation around X, Y and Z-axes are respectively called a pitching, rolling and yawing.

As shown in FIG. 7, force applied to the actuator is generated by the combination of magnetic field formed by a permanent magnet and current flowing along a coil.

Figure 8:
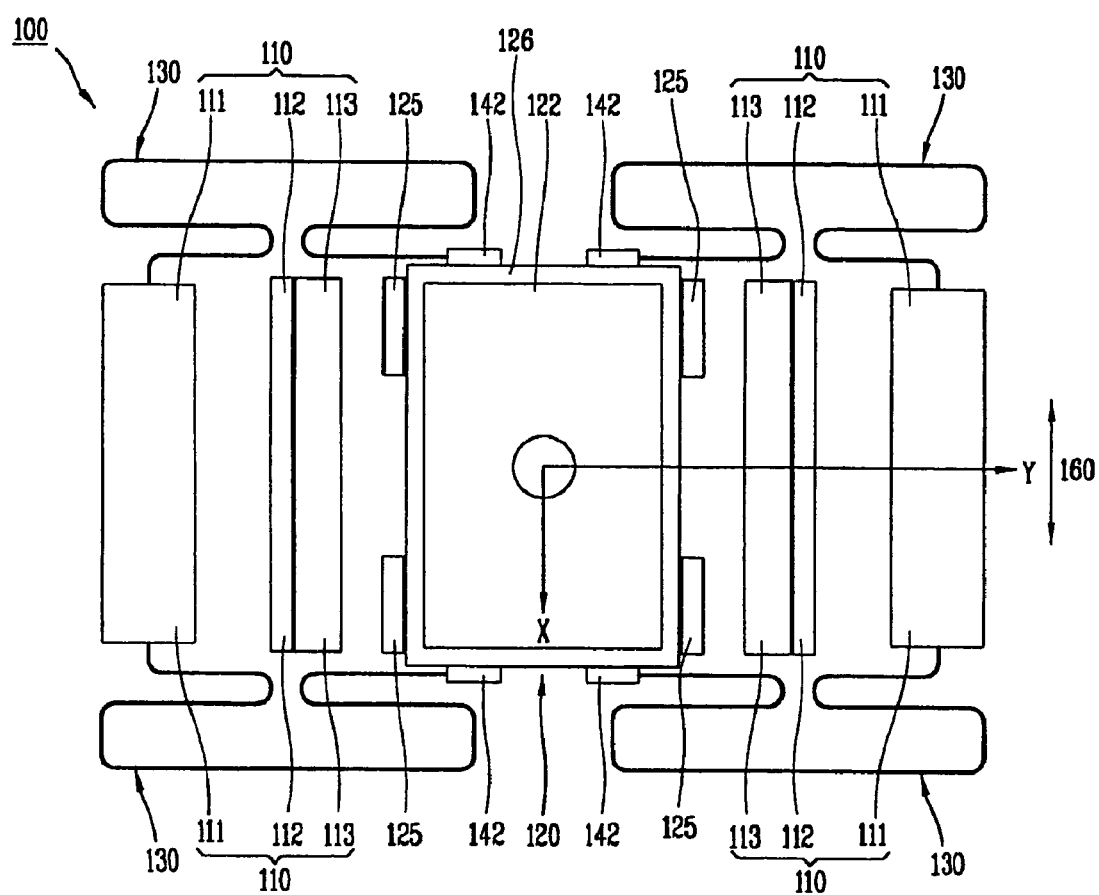
FIGS. 8 and 9 are views illustrating an actuator of an optical pick-up device according to an embodiment of the present invention.
Figure 9:
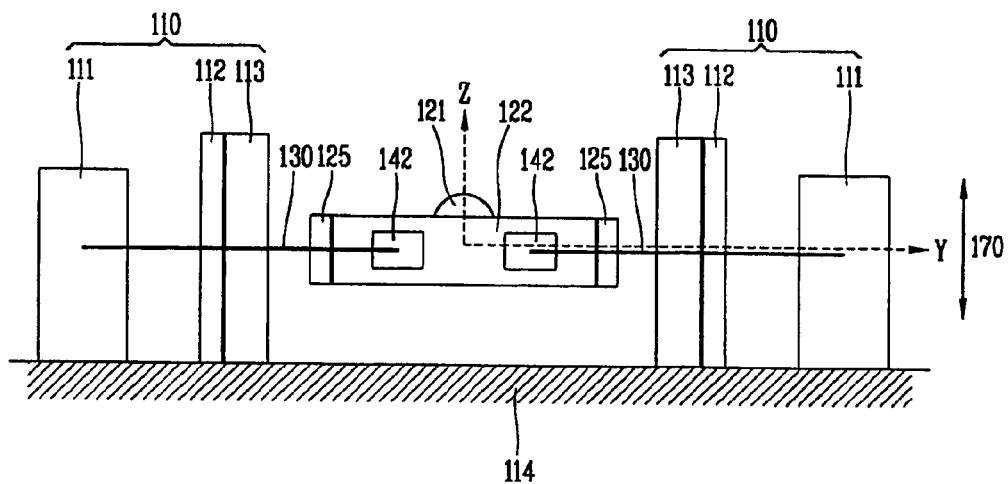

FIGS. 8 and 9 show an actuator for driving an optical pick-up device in an optical writing and reading device according to an embodiment of the present invention.

As shown in the drawings, the inventive actuator 100 of the optical pick-up device includes a movable unit 120 equipped with a focusing lens 121 to move in focusing and tracking directions and a stationary unit 110 supporting the movable part 120 and generating magnetic field.

The stationary unit 110 includes a pair of fixing frames 111 facing each other, a pair of permanent magnets 113 generating the magnetic field, a pair of yokes 112 fixed by pick-up bases 114 to generate a magnetic field path. Leaf springs 130 supports the movable part 120, each having first and second ends respectively fixed on the fixing frame 111 and a spring fixing portion 142 of a lens holder 122.

Particularly, each of the springs 130 is designed in a single step to overcome a space limitation by minimizing a thickness (in a direction of the Z-axis) of the lens holder 122.

The lens holder 122 is designed to be supported at its four points to prevent the unexpected rotation from occurring and to perform the effective movement in the focusing and tracking directions.

Figure 10:
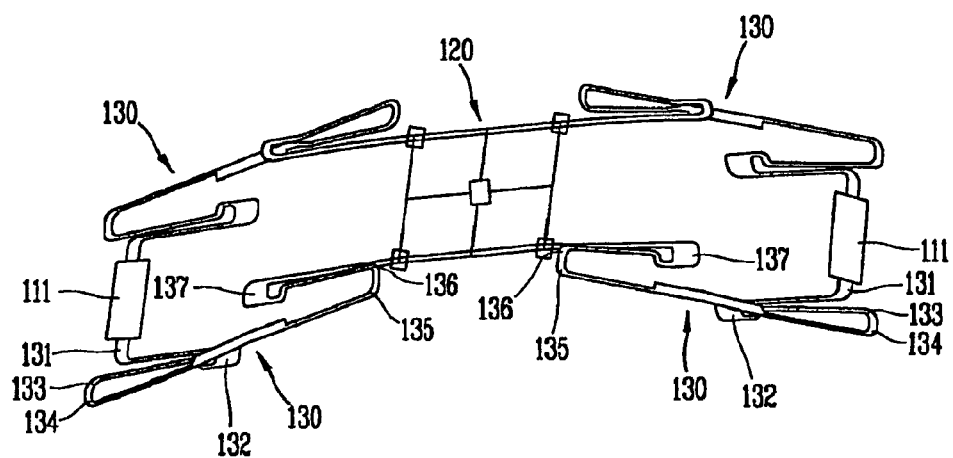
FIG. 10 is a view illustrating a varied state of springs as a lens holder is driven in a focusing direction according to an embodiment of the present invention.
Figure 11:
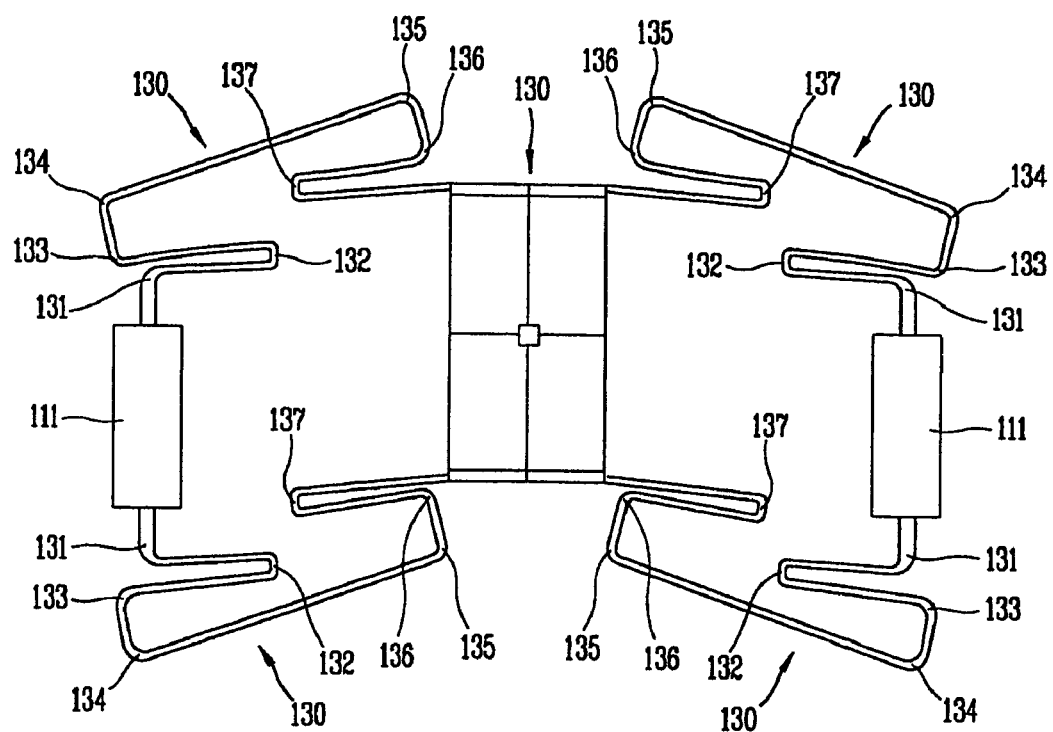
FIG. 11 is a view illustrating a varied state of springs as a lens holder is driven in a tracking direction according to an embodiment of the present invention.

As shown in FIGS. 10 and 11, by forming a plurality of bend portions 131, 132, 133, 134, 135, and 136 on the spring 130, the movement range of the lens holder 122 can be enlarged by twist and bend variations at the bend portions 131, 132, 133, 134, 135, and 136 of the spring 130 without depending on a tensioning variation of the springs 130. In addition, since the springs 130 are less sensitive with respect to a variation of an elastic coefficient according to the twist or bend of the springs 130 that may be incurred in the course of fixing the springs 130 on the lens holder 122 and the fixing frame 111, the driving property of the actuator can be improved.

In addition, by reducing the rigidity of the spring 130 while maintaining a short distance between the fixing frame 111 and the lens holder 122, the inclined angles in the tracking, focusing, rolling and pitching directions can be controlled.

In short, by forming the bends, the assembling error caused by the twisting or bending of the spring, which is incurred during the installing process of the spring, can be minimized even when the movable unit having a small mass is controlled.

In addition, since the tracking or focusing operation is realized using the bends of the spring, it becomes possible to provide an actuator having a good driving property.

Preferably, the springs 130 are installed on the same horizontal plane to effectively control the movement of the lens holder 122 and reduce the thickness of the lens holder 122.

In short, the spring fixing portions 142 where the first ends of the springs 130 are coupled to the lens holder 122 are preferably formed on the same horizontal plane.

In addition, portions where the second ends of the springs 130 are fixed are preferably formed on the same horizontal plane as that where the spring fixing portions 142 are formed.

The movable part 120 includes the focusing lens 121 for focusing a laser beam on a recording layer of the optical disk to form a focused spot at a predetermined size; the lens holder 122 having the focusing lens 121 formed thereat and controlled and driven in the focusing direction 170 and the tracking direction 160; the tracking coil 125 disposed at each of front and rear surfaces of the lens holder 122 to drive the lens holder 122 in the tracking direction 160; the focusing coil 126 wound around the lens holder 122 to drive the lens holder in the focusing direction; and the spring fixing portion 142 disposed at both ends of the lens holder 122 to connect and fix the spring 130 and the lens holder 122.

The pair of one-step springs 130 support the both ends of the lens holder 122 to prevent the lens holder 122 from being unexpectedly inclined when the movable part 120 is driven.

In addition, since rigidity against the driving force of the lens holder 122 in each direction is reduced, the electromotive force required in controlling the lens holder is reduced. Particularly, since the rigidity in the pitching direction is remarkably lowered, the actuator can be applied as a multiple driving actuator.

That is, by properly apply the electric current to the focusing and tracking coils 126 and 125, the inclined angle control becomes possible according to Lorentz force.

In the above-described actuator, the magnetic field is formed around the lens holder 122 by the permanent magnets 113. When the current is applied to the focusing coil 126 disposed in the magnetic field, the electromotive force is generated on the focusing coil 126 to drive the lens holder 122 in the focusing direction (in the vertical direction). Likewise, when the current is applied to the tracking coils 125 located in the magnetic field, the electromotive force is generated on the tracking coils 125 to drive the lens holder 122 in the tracking direction (in the left and right directions).

In short, the actuator drives the lens holder 122 to read data recorded on the recording layer of the optical disk by maintaining a focused spot formed on the focusing lens 121 at a predetermined size.

An actuator having the focusing and tracking coils formed on the lens holder such that the focusing and tracking coils move together with the lens holder is called a moving coil type actuator. An actuator having the permanent magnet formed on the lens holder 122 such that the permanent magnet moves together with the lens holder is called a moving magnet type actuator.

However, it should be noted that the present invention can be applied to the moving magnet type actuator by exchanging the locations of the permanent magnet 113 with the coils 125 and 126.

It should be further noted that locations of the focusing and tracking coils 126 and 125 may be changed with each other according to a design selection.

FIG. 10 illustrates a varied state of the springs 130 as the lens holder 122 is driven in the focusing direction according to an embodiment of the present invention and FIG. 11 illustrates a varied state of the springs 130 as the lens holder 122 is driven in the tracking direction according to an embodiment of the present invention.

Each of the springs 130 has the bends 131, 132, 133, 134, 135, and 136 so that the lens holder 122 can be effectively driven by the twisting and bending operation of the bends 131, 132, 133, 134, 135, and 136.

Figure 12:
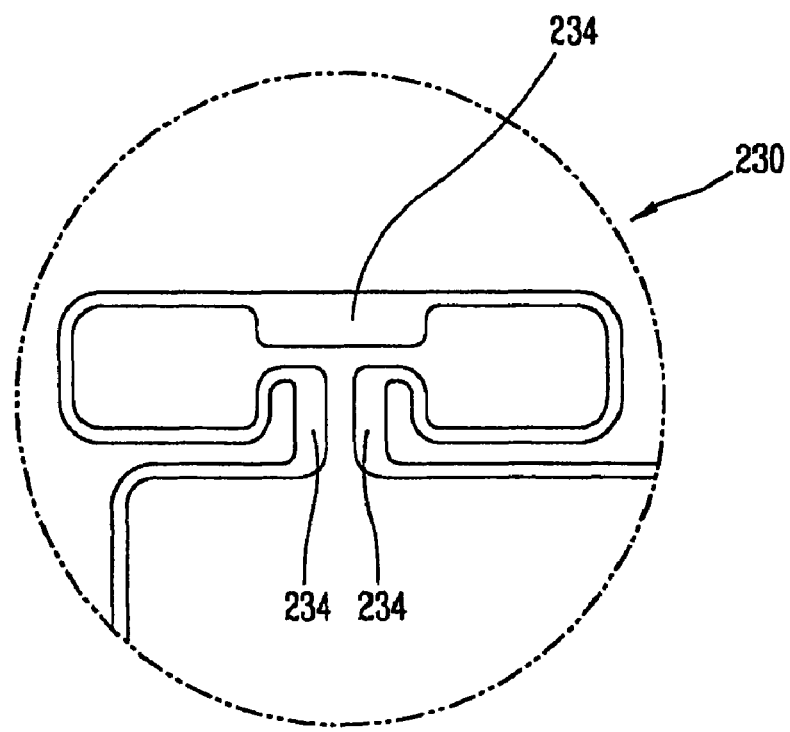
FIG. 12 is a view of a spring assembly of an actuator according to a modified example of the present invention.

FIG. 12 shows a spring 230 of an actuator an optical pick-up device according to another embodiment of the present invention.

The spring 230 is provided with a damping area 234 having a wider width. Damping material is deposited on the damping area 234.

Figure 13:
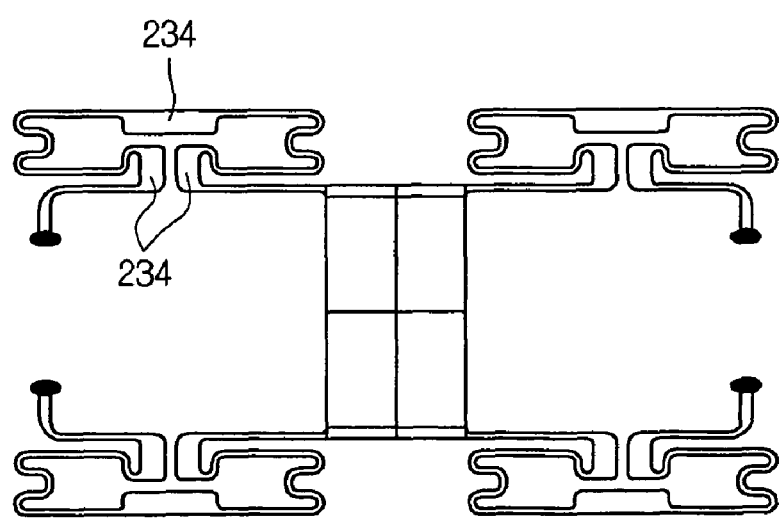
FIGS. 13 through 15 show views illustrating a variety of springs according to modified examples.
Figure 14:
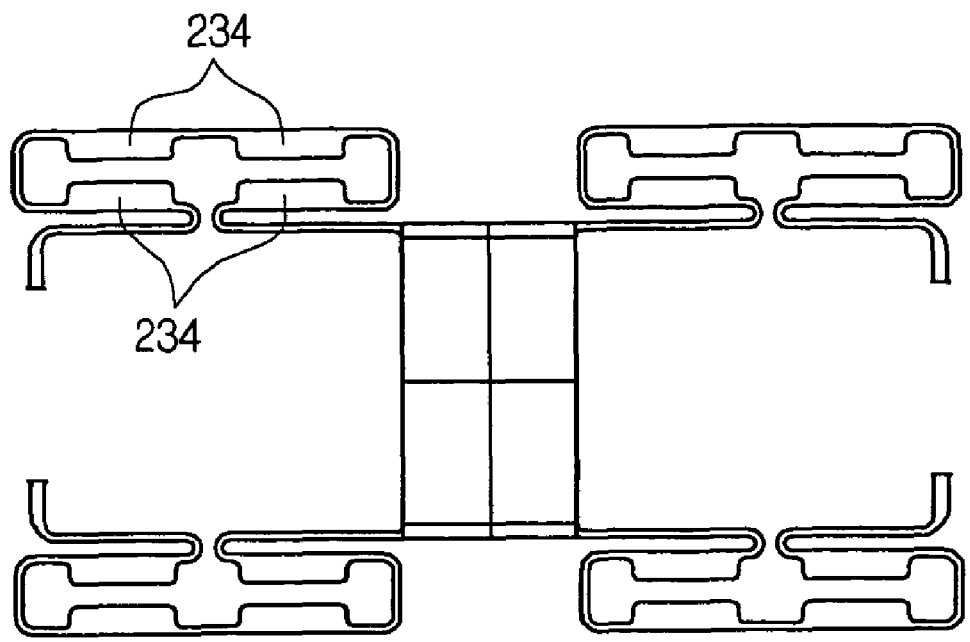
Figure 15:
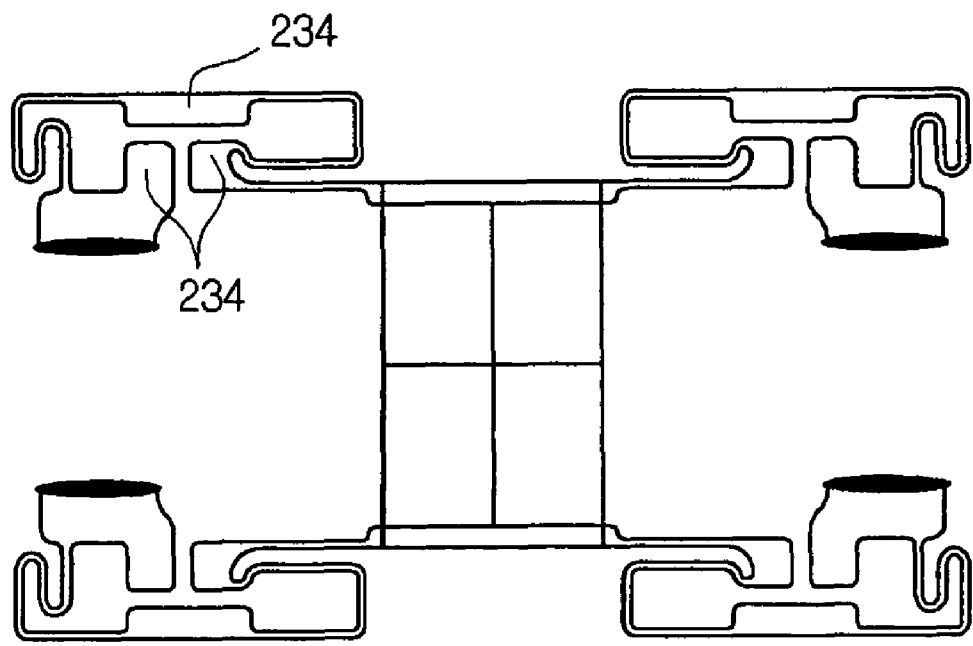

The spring 230 may have bends formed in a variety of shapes. FIGS. 13 through 15 show a variety of modified examples of the springs having different damping areas formed according to the bends.

The damping material such as gel type material is deposited on the damping area 234 and hardened by ultraviolet rays, thereby providing a damping property to the spring. Accordingly, the driving property of the actuator can be more improved.

Figure 16:
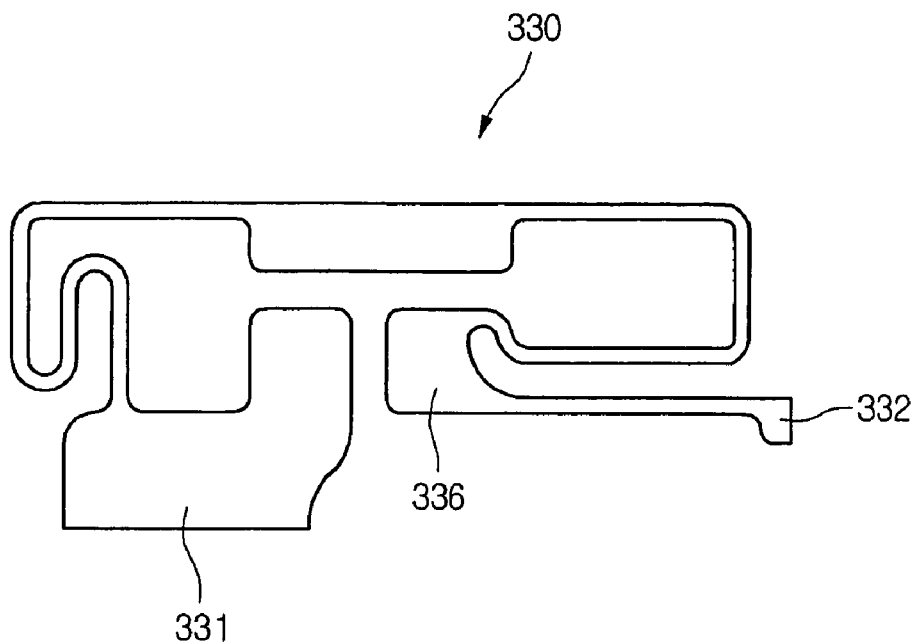
FIG. 16 is a view of a spring of an actuator according to a modified example of the present invention.

FIG. 16 shows another modified example of the spring.

Referring to FIG. 16, a spring 330 of this example has a lens holder coupling portion 332 having a width greater than a portion between the lens holder coupling portion 332 and the first bend 336.

This is for reducing a fixed variation of the spring 330. That is, by differing the width of the lens holder coupling portion 332 from the portion between the lens holder coupling portion 332 and the first bend 336, the rigidities therebetween becomes different from each other.

As a result, an effective area of the spring 330 is defined on a front end of the lens holder coupling portion 332.

The spring coefficient K is generally determined at a less width portion of the spring. However, in this example, since the lens holder coupling portion 332 having the greater width is fixed on the lens holder, the spring coefficient K is increased, thereby reducing the fixed variation.

In addition, the actuator of the present invention has less size and weight compared with the prior actuator. In addition, a mass portion of the springs is about 20-30% of the actuator. Accordingly, the vibration generated by the springs does not remarkably affect the driving property of the actuator.

In order to effectively responding against the vibration of the springs 330 during the drive of the actuator, a stationary portion 331 is formed on a portion where the springs 330 are coupled to the fixing frame.

Figure 17:
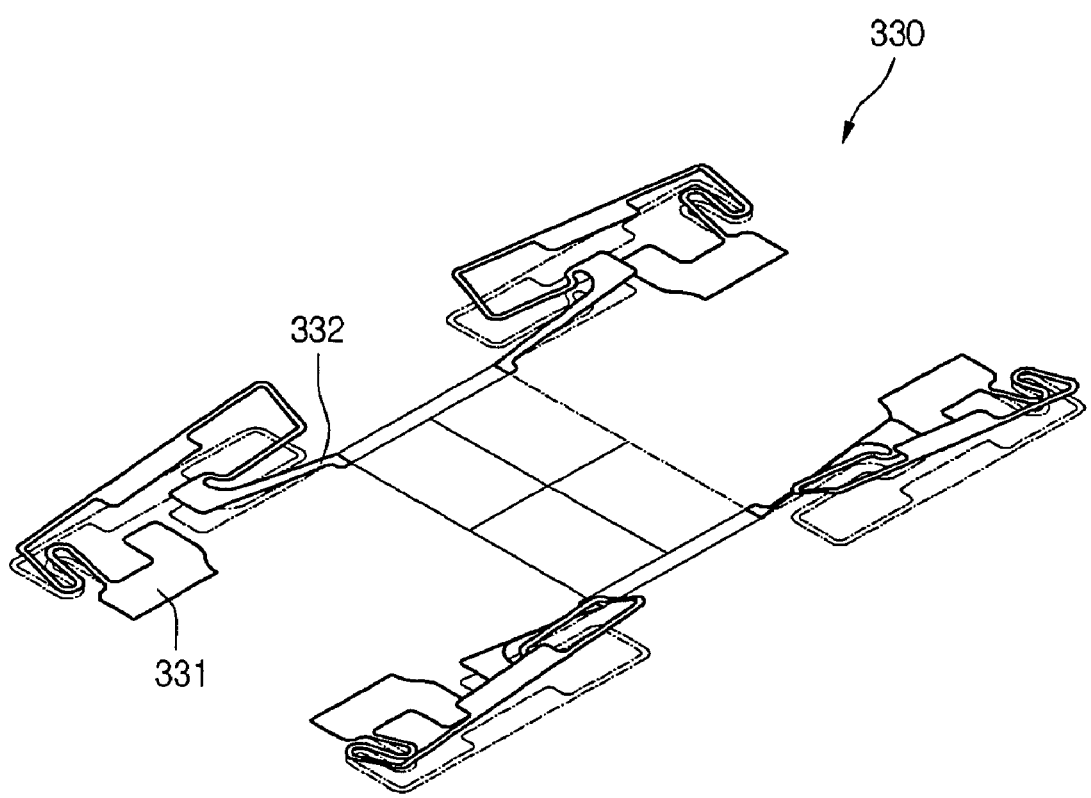
FIG. 17 is a view illustrating a varied state of a spring depending on a motion of a lens holder in a spring structure shown in FIG. 16 according to an embodiment of the present invention.

Here, the stationary portion 332 is coupled to the fixing frame, having a wider width than other portions. The stationary portion 332 is not affected by the movement of the lens holder, not functioning as the spring 330. That is, as shown in FIG. 17, as the lens holder moves, the spring 330 may be twisted or tensioned. However, the stationary portion 331 is not affected by the movement of the lens holder, being fixed on the fixing frame.

That is, by forming the lens holder coupling portion and the stationary portion 331, an actuator having a lower vibration property and an precise driving property can be realized.

As illustrated in conjunction with FIG. 12, a damper having the damping area 234 deposited with the damping material may be further formed to more effectively response to the vibration of the spring 330.

Figure 18:
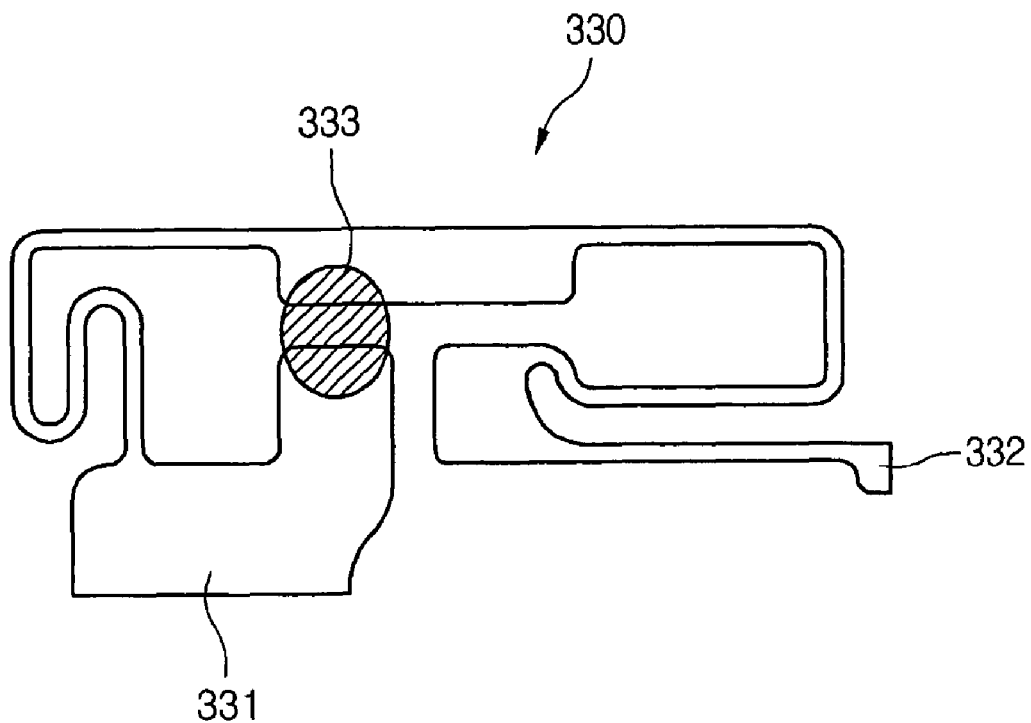
FIGS. 18 through 20 show a spring where damping material is deposited according to an embodiment of the present invention.
Figure 19:
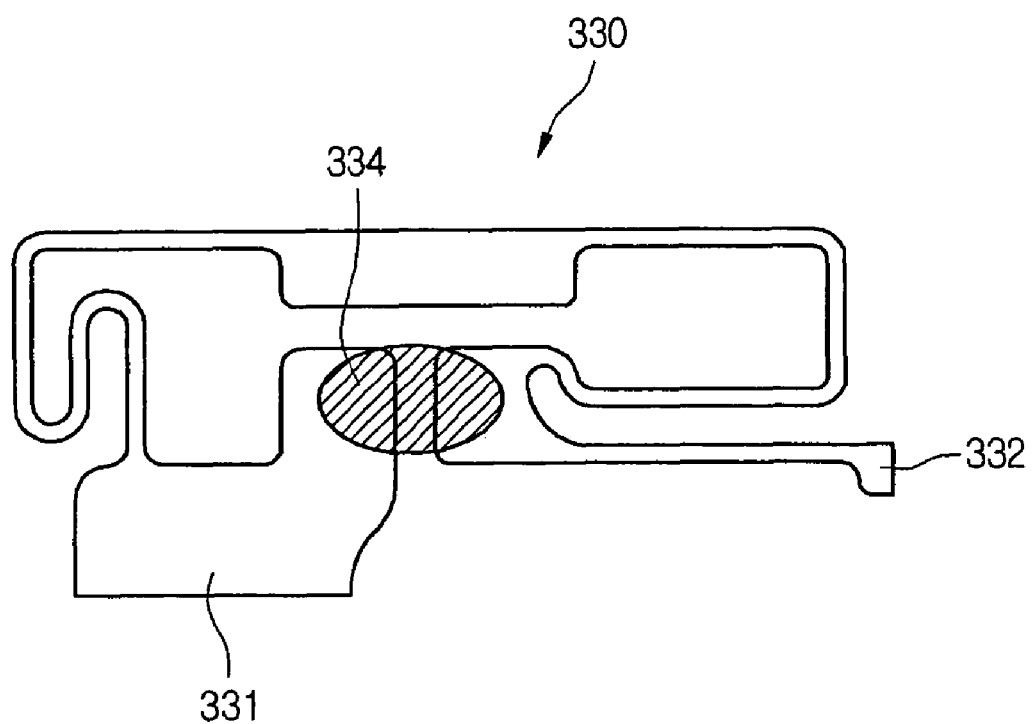
Figure 20:
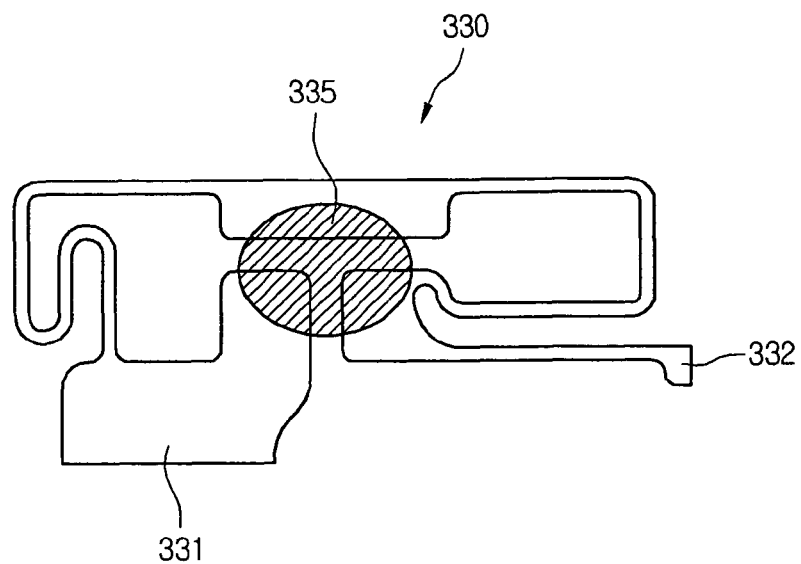

FIGS. 18 through 20 show an example where the damper is deposited on the damping area of the spring.

Dampers 333, 334 and 335 are formed on at least two areas including a damping area 234 of the stationary portion 331.

In the example depicted in FIGS. 18 and 19, the dampers 333 and 334 are formed on the damping area 234 of the stationary portion 331 and the damping area 234 of the spring 330. In FIG. 20, the dampers 335 are formed on the damping area 234 of the stationary portion 311 and two damping areas 234 of the spring 330.

By forming the dampers on the damping area 234 of the stationary portion 131, the unnecessary vibration of the spring 330 can be minimized.

Figure 21:
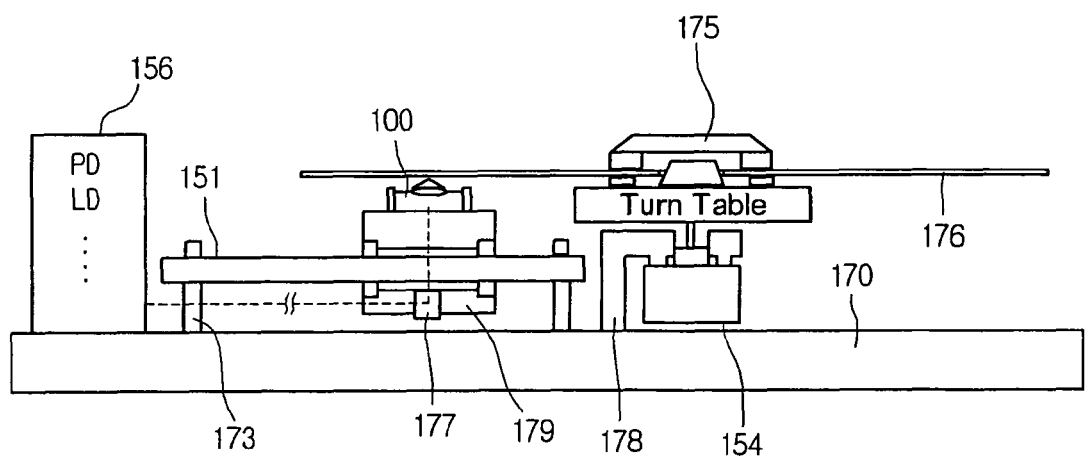
FIGS. 21 and 22 are views illustrating a structure supporting an optical pick-up device of an optical reading/writing device according to an embodiment of the present invention.
Figure 22:
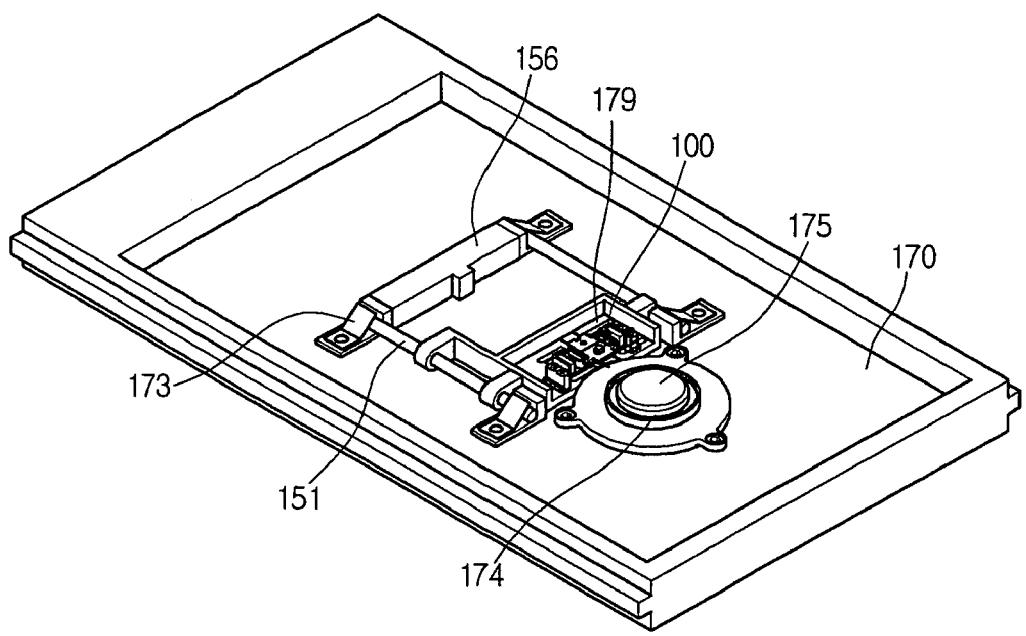

FIG. 21 illustrates a supporting structure of an optical pickup device in an optical writing and reading device according to an embodiment of the present invention, and FIG. 22 is a perspective view illustrating an optical writing and reading device according to an embodiment of the present invention.

There is provided a pickup base 179 for supporting the optical pick-up actuator 100.

The pickup base 179 moves along the main shaft 151.

The main shaft 151 is supported by a main shaft holder 173 fixed on the base 170.

Further, a reflection mirror 177 is fixed to the pickup base 179 to reflect the light incident from the optical system 156 to the focusing lens.

That is, the base 170 functions as a case for supporting the optical pick-up device.

Preferably, unlike the prior optical reading/writing device, the main shaft holder 173 is directly fixed on the base 170.

Further preferably, a spindle motor 154 may be fixed directly or by a spindle motor fixing member 178 on the base 170.

A turntable 175 may be disposed on a top of the spindle motor 154 so that the optical disk 176 can rotate by the turntable 175 driven by the rotation of the spindle motor 154.

An optical system 156 having a laser diode or a photo diode is separated from the optical pick-up actuator 100 and fixed directly on the base 170.

Light radiated from the optical system 156 is reflected by the reflection mirror 177 formed at the pickup base 179 and is then directed to the optical disk 176 via the focusing lens. Light reflected from the optical disk 176 is reflected by the reflection mirror 177 and is then directed to the optical system 156.

Accordingly, it becomes possible to install the optical pick-up actuator 100 and the optical system 156 on the base 170 in a state where they are separated from each other.

As shown in FIGS. 20 and 21, according to the optical reading/writing device, the main shaft holder 173 is directly fixed on the base 170 and the optical system 156 and the spindle motor 154 are respectively formed on both sides of the base 170.

Hence, the rubber damper and the sled base that have been used in the prior optical reading/writing device can be omitted, thereby making it possible to reduce the size and weight of the optical reading/writing device.

Meanwhile, by minimizing the height of the optical reading/writing device, it becomes possible to reduce the size and weight of the optical reading/writing device.

A sled base or a supporting member similar to the sled base may be provided between the base 170 and the main shaft holder 173.

In this case, since a gap between the optical pick-up actuator 100 and the base 170 is determined according to the heights of the spindle motor 154 fixed on the base and the turntable 175 provided on the top of the spindle motor 154, a height of the sled base or the supporting member is designed to be less than that of the sled base used in the prior art.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus, comprising:
a movable unit comprising an optical pick-up actuator, the optical pick-up actuator configured to do at least one of:
emit light to write data to an optical disk; or
receive light to read data from the optical disk; and
a stationary unit comprising a pair of fixing frames that support the movable unit via springs, wherein at least one of the springs includes a first end connected to the movable unit and a second end connected to a fixing frame of the pair of fixing frames, and wherein a damping area of a bend of the at least one of the springs between the first end and another bend of the at least one of the springs is adjacent to a damping area of the second end.

2. The apparatus of claim 1, wherein the pair of fixing frames are opposed and separated by the movable unit, and the movable unit is supported between the pair of fixing frames.

3. The apparatus of claim 2, wherein the stationary unit comprises:

a pair of permanent magnets that generate a magnetic field to adjust the movable unit;

wherein each fixing frame of the pair of fixing frames is connected to the movable unit via two springs.

4. The apparatus of claim 1, wherein each spring comprises bends that at least one of twist, bend, or rotate the movable unit.

5. The apparatus of claim 1, wherein the movable unit comprises:

a lens holder comprising spring fixing holders, wherein the first end of each spring is connected to one of the spring fixing holders.

6. The apparatus of claim 5, wherein the spring fixing holders are coplanar.

7. The apparatus of claim 6, wherein the second end of each spring is installed on a common horizontal plane.

8. The apparatus of claim 5, further comprising:

a tracking coil connected to a surface of the lens holder, wherein the tracking coil adjusts the movable unit based on one or more magnetic fields.

9. The apparatus of claim 8, further comprising:

at least two tracking coils connected to opposite sides of the movable unit.

10. The apparatus of claim 5, further comprising:

a focusing coil wound around the movable unit, wherein the focusing coil adjusts the movable unit based on one or more magnetic fields.

11. The apparatus of claim 3, further comprising:

a lens holder comprising spring fixing holders;

wherein the first end of each of the two springs is connected to spring fixing holders connected to opposite sides of the lens holder.

12. The apparatus of claim 5, further comprising:

a permanent magnet connected to the surface of the lens holder, wherein the permanent magnet adjusts the movable unit based on one or more magnetic fields.

13. The apparatus of claim 12, further comprising:

at least two permanent magnets connected to opposite sides of the movable unit.

14. The apparatus of claim 4, further comprising:

a damping material placed on one or more parts of the at least one of the springs based on the bends of the at least one of the springs.

15. The apparatus of claim 4, further comprising:

a damping material placed on at least one of the damping area of the bend or the damping area of the second end.

16. The apparatus of claim 1, further comprising:

a focusing lens; and a reflection mirror that at least one of:

directs light emitted from the optical pick-up actuator to the focusing lens; or directs light reflected from the optical disk to the optical pick-up actuator.

17. The apparatus of claim 1, wherein the second end of each spring is wider than a portion of the spring between the second end of the spring and an adjacent bend of the spring, and the adjacent bend of the spring comprises a damping area that is wider than the portion of the spring between the second end of the spring and the adjacent bend of the spring.

18. The apparatus of claim 1, wherein the pair of fixing frames is separated in a direction substantially perpendicular to a focusing direction and substantially perpendicular to a tracking direction.

19. The apparatus of claim 1, wherein the at least one of the springs further includes an other damping area between the damping area of the bend and the damping area of the second end, and wherein the other damping area is adjacent to the damping area of the bend of the spring and the damping area of the second end.

20. An apparatus, comprising:

a base;

a main shaft holder fixed to the base;

a main shaft supported by the main shaft holder;

a pickup base supported by the main shaft, wherein the pickup base is moveable along the main shaft; and an optical pick-up actuator formed at the pickup base for emitting light to write data to an optical disk or for receiving light to read data from the optical disk, wherein the optical pick-up actuator includes:

a lens holder including a focusing lens and positioned between two opposed fixing frames;

spring fixing units connected to the lens holder and positioned on a horizontal plane of the lens holder; and a spring connected to a spring fixing unit of the spring fixing units and a fixing frame of the two opposed fixing frames, wherein a lens holder coupling portion of the spring is fixed on the horizontal plane of the lens holder, and wherein a bend of the spring between the lens holder coupling portion and another bend of the spring comprises a damping area near another damping area of an end of the spring associated with the fixing frame.

21. The apparatus of claim 20, further comprising:

a reflection mirror formed at the pickup base for directing light emitted from the optical pick-up actuator to the focusing lens, or for directing light reflected from the optical disk to the optical pick-up actuator.

22. The apparatus of claim 21, further comprising:

a turntable associated with a spindle motor, wherein the turntable is configured to rotate the optical disk.

23. The apparatus of claim 20, wherein the spring comprises bends for at least one of twisting, bending, or rotating the lens holder.

24. An apparatus, comprising:

an optical pick-up actuator that at least one of emits light through a focusing lens to record information on an optical disk or senses information from light received from the optical disk, comprising:

a pair of fixing frames;

a lens holder including the focusing lens;

spring fixing units connected between the pair of fixing frames and the lens holder, wherein the spring fixing units are coplanar with the lens holder; and springs respectively connected to the spring fixing units, wherein at least one of the springs is fixed at a position coplanar with the lens holder, wherein the at least one of the springs comprises a lens holder coupling portion connected to a spring fixing unit of the spring fixing units, and wherein a damping area of a bend of the at least one of the springs positioned between the lens holder coupling portion and another bend of the at least one of the springs is adjacent to a damping area of an end of the at least one of the springs associated with a fixing frame of the pair of fixing frames.

25. An apparatus, comprising:

means for reading and writing data from and to an optical disk supported between two fixing frames;

means for rotating the means for reading and writing data about a horizontal plane when the means for reading and writing data is reading or writing data from or to the optical disk; and means for reducing vibration generated by the means for rotating at damping areas of a spring, wherein a damping area of the damping areas located at a bend of the spring between a fixing frame of the two fixing frames and another bend of the spring is adjacent to another damping area of the damping areas positioned at an end of the spring.

26. A method, comprising:

coupling a movable unit of an optical reading and writing device to four points of a stationary unit of the optical reading and writing device via springs, wherein the four points of the stationary unit are on a common horizontal plane; and forming bends on the springs to effect movement of the movable unit, wherein a first bend of a spring of the springs positioned between a point of the four points and a second bend of the spring includes a damping area close to a damping area of an end of the spring.

* * * * *

UNITED STATES PATENT AND TRADEMARK OFFICE
CERTIFICATE OF CORRECTION

| | | |
|---|---|---|
| PATENT NO. | : 7,907,479 B2 | Page 1 of 1 |
| APPLICATION NO. | : 11/033795 | |
| DATED | : March 15, 2011 | |
| INVENTOR(S) | : Hong et al. | |

It is certified that error appears in the above-identified patent and that said Letters Patent is hereby corrected as shown below:

Column 9, line 66, in Claim 19, delete "an other" and insert -- another --.

Signed and Sealed this
Nineteenth Day of July, 2011

David J. Kappos
*Director of the United States Patent and Trademark Office*